UNITED STATES PATENT OFFICE.

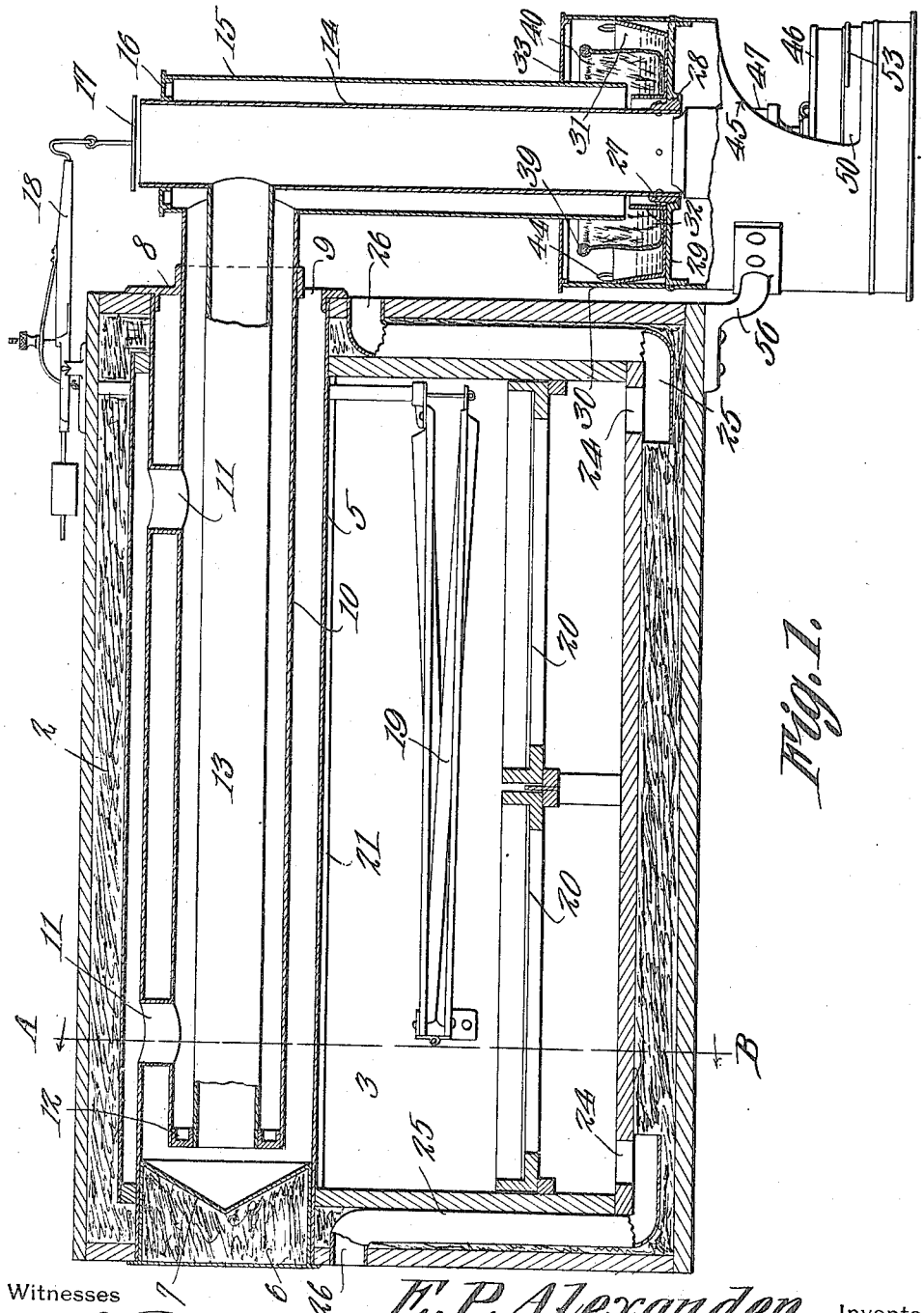

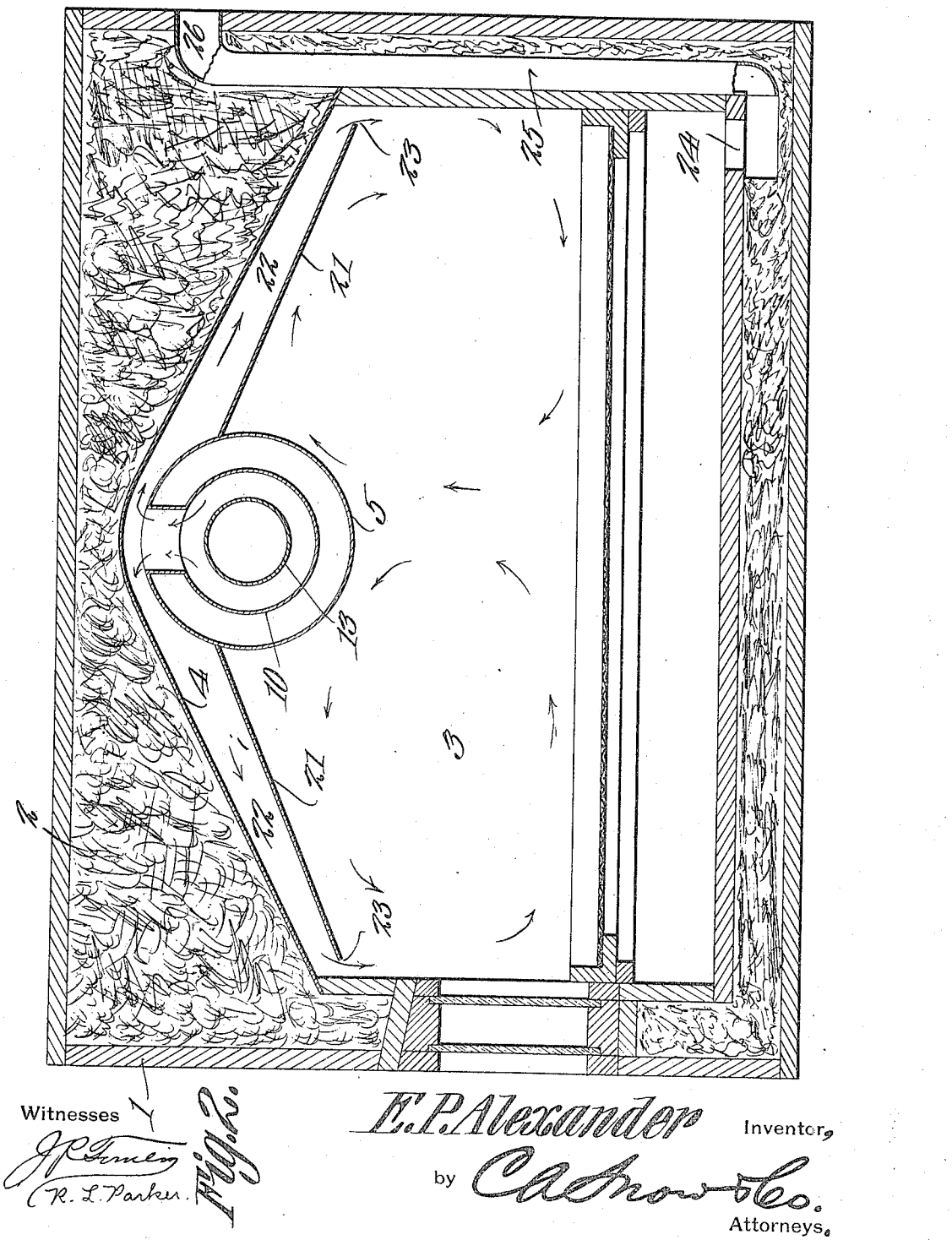

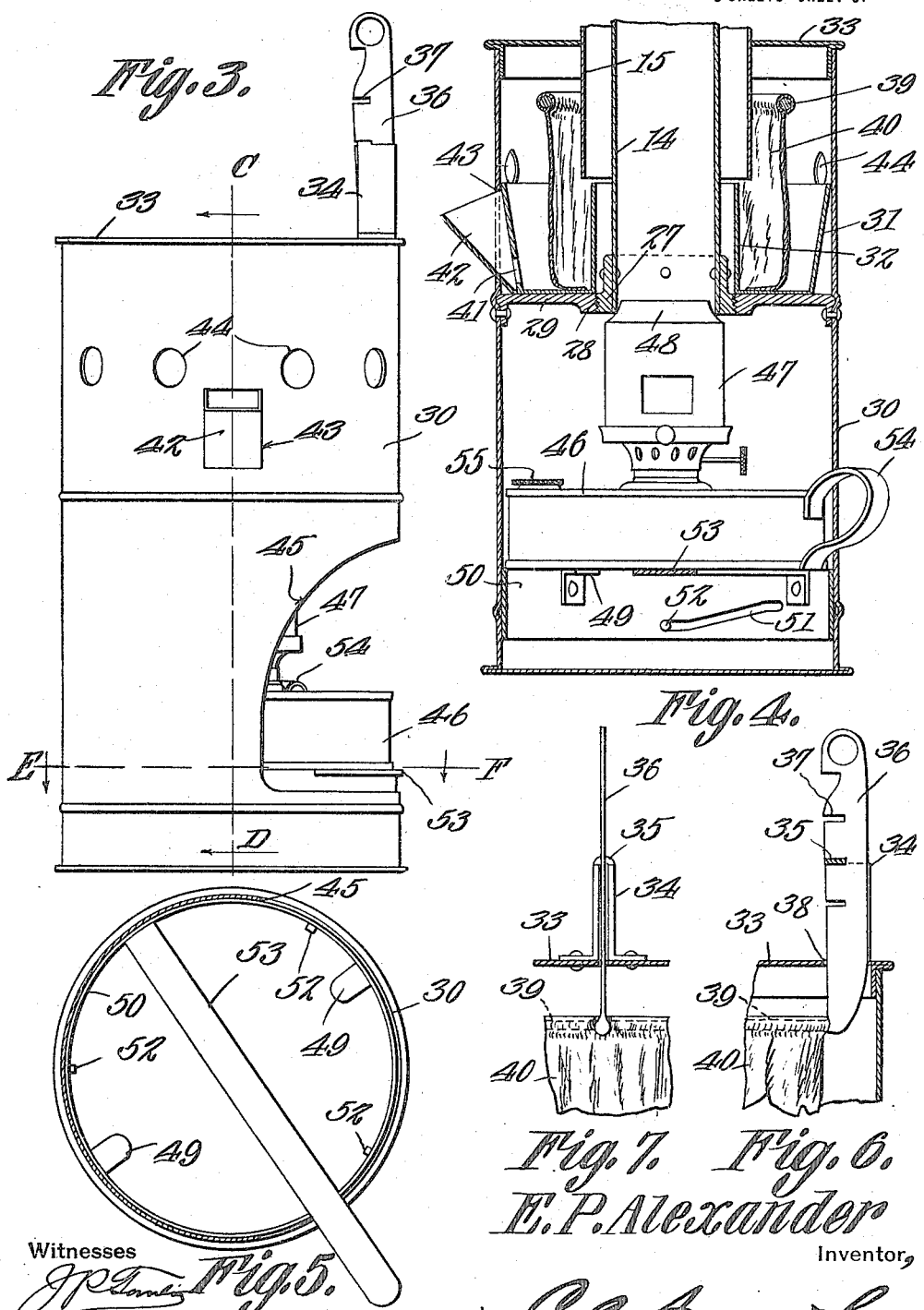

ELMER P. ALEXANDER, OF YEAGERTOWN, PENNSYLVANIA.

INCUBATOR.

1,202,641. Specification of Letters Patent. Patented Oct. 24, 1916.

Application filed March 20, 1915. Serial No. 15,891.

*To all whom it may concern:*

Be it known that I, ELMER P. ALEXANDER, a citizen of the United States, residing at Yeagertown, in the county of Mifflin and State of Pennsylvania, have invented a new and useful Incubator, of which the following is a specification.

This invention relates to incubators.

One of the objects of the present invention is to provide a form of incubator in which a constant circulation of fresh air and an approximately uniform temperature can be maintained automatically and in a manner which is thoroughly practical.

Another object is to provide a novel arrangement of downwardly diverging flues so constructed as to expel the heated air downwardly in sheets into the egg chamber at the walls thereof, eddy currents being set up which result in a thorough distribution of the heated air and a uniform temperature throughout the interior of the egg chamber, the circulation being induced and maintained solely by the use of an air heating means.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—Figure 1 is a vertical longitudinal section through an incubator having the present improvements. Fig. 2 is an enlarged vertical transverse section through the incubator, said section being taken on the line A—B Fig. 1. Fig. 3 is a side elevation of the heater and humidor used in connection with the incubator. Fig. 4 is a section on line C—D Fig. 3. Fig. 5 is a section on line E—F Fig. 3. Fig. 6 is a side elevation of the wick adjuster of the humidor, the supporting bracket used in connection therewith being in section. Fig. 7 is a front elevation of the structure shown in Fig. 6.

Referring to the figures by characters of reference 1 designates the casing of the incubator, the same being preferably provided with suitable insulating material 2 in the walls thereof. The top wall of the egg chamber 3 is inclined downwardly from the longitudinal center of the chamber to the side walls, as shown at 4 and arranged longitudinally under the highest or middle portion of the top wall 4 is an elongated drum 5 the ends of which are seated preferably in the opposed end walls of the casing 1 as shown particularly in Fig. 1. A plug or closure 6 is removably mounted in one end portion of this drum and has its inner end recessed, as at 7, thus to form a spreader. The other end of the drum is engaged by a spacing and supporting ring 8 having one or more inlet openings 9 for maintaining communication between the external atmosphere ad the interior of the drum 5. Ring 8 supports a sleeve 10 which is preferably concentric with the drum 5 and terminates close to the deflector 7, there being connecting tubes 11 extending from the upper portion of the sleeve 10 to the upper portion of the drum 5, thus to establish communication between the interior of the sleeve 10 and the upper portion of the egg chamber 3. The inner end of the sleeve 10 surrounds a spacing ring 12 which, in turn, serves to center within the sleeve 10 the inner end of a flue 13. The outer end of this flue is in communication with the vertical flue 14 of the heater and this vertical flue extends through and is preferably concentric with a vertical sleeve 15 which is in communication with the outer end of the sleeve 10. The upper end of flue 15 is closed by a ring 16 or in any other suitable manner, while the lower end of said sleeve is open.

A damper 17 is supported above the flue 14 by a lever 18 and this lever is controlled by a thermostat 19 located within the egg chamber and above the egg trays 20. The thermostat and the damper lever controlled thereby do not constitute any part of the present invention but have been made the subject matter of a separate application. It is thus deemed unnecessary to describe or illustrate the same in detail.

Extending from opposed portions of the drum 5 are longitudinal partitions 21 coöperating with the top wall 4 of the egg chamber to form downwardly diverging flues 22 having outlets into the egg chamber 3 along the side walls of said chamber, as shown at 23.

Formed in the bottom of the egg chamber preferably close to the walls thereof, are outlet openings 24 which open into the lower ends of outlet flues 25 which extend upwardly within the walls and open into the external atmosphere through outlets 26 in the walls of the casing 1 at points above the plane of the egg trays.

The lower end of the flue 14 has an exteriorly threaded ring 27 secured to it, this ring in turn engaging the walls of an opening 28 formed in the center of a disk 29. Said disk is secured within the casing 30 of the heater and serves to support a ring-like tray or container 31 the inner upstanding wall 32 of which is disposed close to the lower portion of the flue 14 and extends close to the lower end of the sleeve 15, there being a sufficient space between the wall 32 and the sleeve 15 to permit air to flow readily into the sleeve from the pan or container 31. The top of the casing 30 is closed by a removable cover 33 which fits snugly around the sleeve 15 and has mounted upon it an inverted loop or bracket 34 the flat upper end portion 35 of which constitutes a keeper for engagement by a hanger 36. This hanger is provided in one edge with notches 37 any one of which is designed to receive the keeper 35 so that it is thus possible to adjust the hanger 36 to different elevations. Said hanger extends through a slot 38 in the cover 33 and is fixedly connected, at its lower end, to a ring 39 supported in a substantially horizontal position within the casing 30 and above the pan or container 31. This ring is engaged by the upper end portion of a circular wick 40 the lower end portion of which projects into the pan or container 31. Obviously by means of the adjustable hanger 36, the wick can be adjusted vertically so as to extend to any desired distance from the cover 33. The pan or container 31 is adapted to hold a supply of water, the said water being admitted thereto through an opening 41 in communication with a feed spout 42 which extends through an opening 43 in the wall of casing 30. Air inlet openings 44 are provided in the wall of casing 30 close to the upper edge of the pan or container 31.

That portion of the casing 30 below the partition disk 29 has an opening 45 which gradually increases in width toward its lower end. This opening is so proportioned as to permit the ready insertion or removal of a heating lamp indicated at 46. The chimney 47 of the lamp has its upper end reduced, as at 48, so that when the lamp is raised, this reduced portion will project into and fit snugly within the lower end portion of the flue 14. The lamp 46 is mounted on supporting lugs 49 carried by a ring 50 which is mounted for rotation in the casing 30 below the opening 45. This ring has one or more inclined slots 51 into which project lugs 52 extending inwardly from the wall of casing 30. A lever 53 is secured to the ring 50 and projects outwardly through the opening 45, this lever constituting means whereby the ring 50 can be rotated so as thus to cause it to move upwardly or downwardly upon the lugs 52. When the ring is turned in one direction it will move upwardly, thus forcing the reduced upper end 48 of the chimney 47 into the lower end of flue 14 and preventing removal of the lamp 46 from the casing 30. However, when the ring 50 is rotated in the opposite direction, it will move downwardly within the casing, thus allowing the lamp to move therewith and withdrawing the reduced upper end 48 of chimney 47 from the flue 14. Consequently the lamp can be easily removed through the opening 45. The handle 54 of the lamp extends through the opening 45 but the filling opening in the reservoir of the lamp 46 and which is normally closed by a cap 55, is located diametrically opposite the handle 54 so that access thereto is not possible unless the lamp is entirely removed from the casing 30. Thus objections made by fire underwriters to some forms of heating lamps are overcome, in that it is impossible to fill the lamp as long as it is in position within the heater casing.

It is to be understood that the casing 30 can be supported in any manner desired, as by means of a bracket 56 secured to the casing 1.

Assuming that the damper 17 is closed and the heating lamp has been elevated so as to seat the upper end portion of its chimney within the lower end of the flue 14, the hot gases generated will flow upwardly within flue 14 to flue 13 and be discharged against the deflector 7 whereupon they will flow along the interior of the drum 5 and around the sleeve 10 to the opening or openings 9. Should the temperature within the egg chamber rise to a predetermined degree, the damper 17 will be opened automatically by the thermostat 19 so that the hot gases ascending within the flue 14 will escape from the top thereof, thus creating a suction through the flue 13 so that cool air will be drawn into the drum 5 through the opening or openings 9, thus chilling the drum and correspondingly reducing the temperature within the egg chamber.

When the flue 14 is heated, the surrounding jacket of air within the sleeve 15 is likewise heated and caused to rise, thus creating a suction through the inlet openings 44. As air will follow the lines of least resistance, the current thus set up will tend to flow between the wick 40 and the cover 33 but by adjusting the wick vertically, more or less of the air will be crowded through the wick which is maintained moist by capillary attraction. Consequently by adjusting the wick, the air supplied to the sleeve 15 can be charged with any amount of moisture desired before being subjected to the action of the heat radiating from the flue 14. As the moisture laden air enters the sleeve 15 it is heated and flows upwardly into the flue 10 where its temperature is increased by the heat radiating from the flue 13. The heated air passes through the connecting tubes 11 into the highest portion of the egg chamber and is then distributed laterally through the flues 22 and outlets 23 to the side portions of the egg chamber. The moisture laden heated air will thus enter the egg chamber at the coldest points (at the walls thereof) and will circulate inwardly toward the center of the egg chamber and close to and over the egg trays. At the same time, accumulations of heavy carbon dioxid generated within the egg chamber will be displaced downwardly through the openings 24 by the fresh heated air admitted to the egg chamber and upon entering the flues 25 will, by reason of its high temperature, rise within the flues and pass through opening 26 into the external atmosphere. It will be obvious that this circulation of air through the egg chamber is continuous, thus avoiding the creation of any stagnant or dead air within the incubator. Furthermore all of the fresh air supplied to the incubator is first supplied with moisture so that the same degree of humidity is maintained at all times. When the damper 17 is closed the moist fresh air passing into the incubator is heated not only by the flue 14 but also by the flue 13 and the heated wall of the sleeve 10, and the air within the egg chamber is further heated by the drum 5. When the damper 17 is opened, that portion of the air within the sleeve 15 is heated sufficiently to create a circulation into and through the egg chamber but the said air is tempered or reduced in temperature by the cool air which is sucked into the drum 5 through openings 9 and thence through the flue 13 into the upper portion of flue 14, as hereinbefore pointed out.

It has been found in practice that by utilizing a heating means such as herein described, the position of the damper 17 remains practically the same at all times during the operation of the incubator. It has been found, furthermore, that by utilizing a humidor such as formed by the container 31 and the adjustable wick 40 the degree of humidity can be maintained practically the same under varying atmospheric conditions so that the eggs will at no time be injured by a scarcity or excess of moisture.

By providing the closure 6, access may be had readily to the interior of the tempering drum 5 for the purpose of cleaning the same.

By referring particularly to Fig. 2 it will be seen that the outlets 23 of the heated air flues or passages 22 are disposed substantially in the same horizontal plane with the lowermost portion of the drum 5 so that equal distribution of heat within the egg chamber is insured, the heated air being expelled in sheets through the reduced outlets from passages 22 along the cool walls of the egg chamber and then flowing inwardly and upwardly to form eddy currents.

What is claimed is:—

1. An incubator having a heating device, a hot air flue extending upward therefrom and having a valve at the upper end adapted to be thermostatically controlled, a hot air flue leading away from said first mentioned flue and through the incubator and having a concentric return portion leading to the atmosphere, and a heated air passage surrounding said upwardly extending hot air flue and extending between the concentric portions of the hot air flue in the incubator, said air passage and communicating with the interior of the incubator.

2. An incubator having a heating device, a hot air flue extending upward therefrom and having a valve at its upper end, a lateral hot air flue connecting with said first mentioned hot air flue and having a concentric return portion opening to the outside atmosphere, said lateral flue serving to conduct hot air into the incubator to heat the flue and its return when said valve is closed, and to conduct cold air thereinto to chill the flue and its return when said valve is open, and a fresh air flue between the hot air flue and its return and opening into the incubator.

3. An incubator having a heating device, a hot air flue leading upwardly therefrom, a valve at the upper end thereof, a laterally extending combined hot and cold air flue leading from said hot air flue, and extending backward and forward upon itself, in a series of annularly separated portions, and a heated air passage extending within and surrounding said combined hot and cold air flue.

4. An incubator having a heating device, a hot air flue leading upwardly thereform, a valve at the upper end thereof, a laterally extending combined hot and cold air flue leading from said hot air flue and extending backward and forward upon itself in a series of annularly separated portions, a heated air passage extending within and surrounding said combined hot and cold air flue, and a door located at one end of said combined hot and cold air passage for facilitating the cleaning of said passage.

5. An incubator having a heating device provided with a hot air flue adapted to be thermostatically controlled, a combined hot and cold air flue communicating with said hot air flue at a point below the upper end thereof, and a heated air flue communicating with the atmosphere and located adjacent said hot air flue and said combined hot and cold air flue, and discharging along downwardly diverging lines into the incubator adjacent the sides thereof.

6. An incubator having a heating device provided with a hot air flue adapted to be thermostatically controlled, a combined hot and cold air flue communicating with said hot air flue at a point below the upper end thereof, and a heated air flue communicating with the atmosphere and located adjacent said hot air flue and said combined hot and cold air flue and discharging along downwardly diverging lines into the incubator and against the sides thereof, thereby to set up opposed eddies of heated air within the incubator, said outlets of the heated air flue being in substantially the same horizontal plane with the lowermost portion of the combined hot and cold air flue.

7. An incubator having a heating device provided with a hot air flue adapted to be thermostatically controlled, a combined hot and cold air flue communicating with said hot air flue at a point below the upper end thereof, and having a concentric portion leading to the external atmosphere, a heated air flue communicating with the atmosphere and located between said hot air flue and its return portion, and means for discharging the heated air from its flue downwardly along diverging lines against the sides of the incubator, and means for supplying moisture to the air prior to its admission to the heated air flue.

8. An incubator having a heating device, a heated air passage surrounding the heating device, downwardly diverging heated air passages discharging into the egg chamber of the incubator along the walls thereof and constituting means for directing sheets of heated air downwardly into the egg chamber, and an exhaust passage leading from the incubator, said exhaust passage and the downwardly diverging heated air passages coöperating to set up eddy currents of heated air within the egg chamber.

9. An incubator having a heating device, a hot air flue extending upward therefrom and having a valve at its upper end, a lateral hot air flue connecting with said first mentioned hot air flue and having a concentric return portion opening to the outside atmosphere, said lateral flue serving to conduct hot air into the incubator to heat the flue and its return when said valve is closed, and to conduct cold air thereinto to chill the flue and its return when said valve is opened, a fresh air flue between the hot air flue and its return, and means for directing sheets of heated fresh air downwardly along diverging lines from said fresh air flue and against the walls of the incubator.

10. An incubator having a heating device, a hot air flue extending upward therefrom and having a valve at its upper end, a lateral hot air flue connecting with said first mentioned hot air flue and having a concentric return portion opening to the outside atmosphere, said lateral flue serving to conduct hot air into the incubator to heat the flue and its return when said valve is closed, and to conduct cold air thereinto to chill the flue and its return when said valve is opened, a fresh air flue between the hot air flue and its return, said fresh air flue opening into the incubator, and means for supplying moisture to the fresh air prior to its admission to the fresh air flue.

11. An incubator having a heating device, a hot air flue extending upwardly therefrom and having a valve at the upper end adapted to be thermostatically controlled, a hot air flue leading away from said first mentioned flue and through the incubator and having a return portion surrounding it and leading to the atmosphere, and a heated air passage surrounding said upwardly extending hot air flue and extending between the hot air flue and its return portion in the incubator, said air passage communicating with the interior of the incubator.

In testimony that I claim the foregoing as my own, I have hereto affixed my signature in the presence of two witnesses.

ELMER P. ALEXANDER.

Witnesses:
WM. H. WREN,
L. V. ALEXANDER.

Copies of this patent may be obtained for five cents each, by addressing the "Commissioner of Patents, Washington, D. C."